2,886,298
Patented May 12, 1959

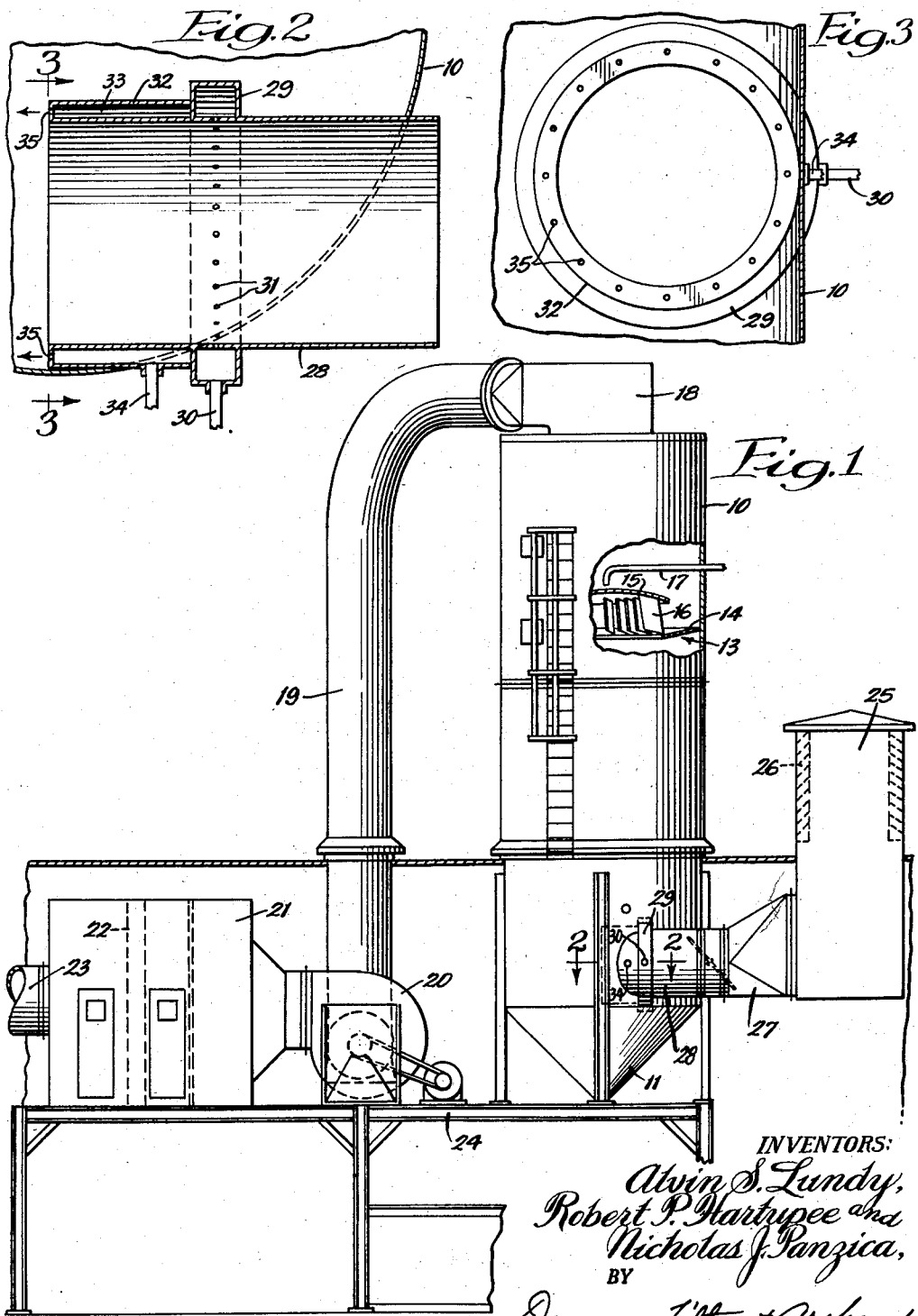

2,886,298
AIR TREATING SYSTEM

Alvin S. Lundy, Bloomfield Hills, and Robert P. Hartupee and Nicholas J. Panzica, Detroit, Mich., assignors to Claude B. Schneible Company, Inc., Detroit, Mich., a corporation of Michigan Application January 16, 1956, Serial No. 559,385

5 Claims. (Cl. 261—14)

This invention relates to an air-treating system, and is particularly useful in the treating of air which is to be employed in enclosures such as paint spray booths and in other operations in which dust or other particulate matter is harmful.

An object of the present invention is to provide effective means for treating air which is to be passed to a spray booth and other like operation, employing in such treatment steam which is introduced into the air stream passing into or through the collector and which eventually may be passed, if desired, through a reheating chamber. A further object is to provide, in combination with a dust collector or air-treating chamber, means for introducing steam directly into the air body in such a manner as to heat the air, overcome the repellency of the dust particles, and to produce a heated pure air stream freed of particulate matter. Yet another object is to provide apparatus and method steps whereby incoming air is rapidly treated for removal of the particles therein, while being warmed through the application of steam. Other specific objects and advantages will appear as the specification proceeds.

The apparatus with which the new method steps may be employed is shown in an illustrative embodiment by the accompanying drawing, in which Figure 1 is a broken view in elevation showing apparatus embodying our invention and with which the new method steps embodying our invention may be employed;

Fig. 2, an enlarged sectional detail view, the section being taken as indicated at line 2—2 of Fig. 1; and Fig. 3, a sectional view, the section being taken as indicated at line 3—3 of Fig. 2.

In the illustration given, 10 designates a column of a type employed to bring about intimate contact between liquid and gas, vapor, or both. Such columns or towers are old and are illustrated in general in Patents 2,141,829 and 2,596,106. The column 10 is provided with a conical bottom portion 11 and a vertical cylindrical portion 12 provided with baffles as indicated by the numeral 13. Each of the baffles 13 comprises a ring 14, a plate 15, and vanes 16. A liquid pipe 17 introduces water or other liquid into the interior of the chamber. Since such structure is well known, a detailed description herein is believed unnecessary.

The column 10 is provided at its top with an outlet pipe 18 which communicates with a downwardly extending pipe 19 leading to a blower 20, and the blower passes the air through a chamber provided by a casing 21 and in which are mounted steam coils 22 or other means for reheating the air and thence the air is passed through the duct 23 to the spray booth or other point of operation. The foregoing apparatus may be supported upon a base 24, as illustrated.

The air introduced into the column 10 is preferably drawn into a vertical air inlet enclosure 25, provided near its top with fixed louvers 26 providing a bird screen, and the air leaves the lower part of the enclosure 25 through the pipe 27, having a reduced portion 28 leading tangentially into the interior of the column 10, as shown best in Fig. 2.

Steam is introduced into the air entering column casing 10 through jacket means in the following manner: We provide an annular chamber or jacket 29 about the pipe 28 and a steam pipe 30 communicates with the chamber. The column 10 is provided with spaced steam inlets 31 extending through the wall of the pipe 28 so as to discharge jets of steam into the entering air. Extending inwardly of the chamber 29 is a second casing 32 which provides a jacket or steam chest 33 around the pipe 28, and a second steam pipe 34 communicates with the jacket 33. Portions of the casings 29 and 32 are outside of the column casing 10, while other portions are inside the column. Jacket 33 provides a heating enclosure for the pipe 28 and the steam is allowed to escape through the end openings 35 of the jacket into the interior of the column 10. Preferably, the jacket means includes two jackets of the character described but the advantage of the invention can be obtained when the jacket means includes a single jacket with the steam outlets described.

It is found that dust and other light, particulate matter often is repellent to moisture and water, and this repellency is greater under different temperature conditions. By employing steam at the entrance of the air into the column, we find that the normal repellency of the dust or small particulate matter is overcome and the washing water or other fluid is then highly effective in removing the particulate matter. Further, the warmed air responds more readily to the washing treatment in the yielding of the particulate matter, and the extremely high efficiency of the steam is utilized in full for the heating of the air as well as for the other results described.

Operation

In the operation of the apparatus, fresh air is drawn through the intake louvers 26 and thence downwardly through the enclosure 25 and into pipes 27 and 28. Here, the incoming air meets the steam injected through the openings 31 and through the openings 35, and at the same time the air is warmed by contact with the jacketed portion of pipe 28, as well as by the steam already referred to. Effective mixing of the steam with the air is accomplished by reason of the tangential entrance of pipe 28 into the chamber 10, and as the rotating column of air passes upwardly, it meets the downcoming liquid streams and effective removal of particulate matter is brought about. The warmed air thence passes out of the top of the column 10 and is forced by blower 20 through a reheating chamber 21 to the degree desired for the spray booths, and from the chamber 21 the air is passed through duct 23 to a spray booth or chamber. It will be understood that the duct 23 may lead to any working area at which warmed air freed of particulate matter is to be supplied.

While the above process has been described largely in connection with the treatment of air for paint spray booths, and the like, it will be understood that the treated air may be employed for many other purposes, as, for example, the treated air may be supplied to the aging cellars for beer or other beverages, the steam being employed to heat supplied air in cold weather, etc., and in such treatment, a reheat chamber for the air may not be required.

The steam jacket illustrated in detail in Fig. 2 is found to be particularly useful in preventing condensation on the inner surface of the collector 10. When introducing steam to heat rather cold air, particularly where low pressure steam is used, the steam will increase the humidity of the entering air stream sometimes to the extent that condensation on the interior surface of the collector air inlet occurs unless a portion of the steam is passed through the steam jacket on the air inlet. By employing the steam jacket illustrated best in Fig. 2, it is found that such condensation is avoided.

While, in the foregoing specification, we have set forth a specific structure in considerable detail for the purpose of illustrating embodiments of the invention, it will be understood that such details of structure, as well as procedure, may be varied by those skilled in the art without departing from the spirit of our invention.

We claim:

1. In combination with an air-treating column providing a cylindrical chamber, an air inlet pipe tangentially entering said chamber, means for contacting the air in said chamber with liquid, means for withdrawing air from the upper portion of said chamber and jacket means enclosing a portion of the inlet pipe, and means for introducing steam into said jacket means, said jacket means having apertures for discharging steam into the air at spaced points along the length of said inlet pipe.

2. The structure of claim 1, in which said jacket means comprises a jacket providing an annular chamber about said inlet pipe and said pipe is apertured at spaced intervals about the periphery of said pipe to provide inlets to said pipe and which jacket means also includes a jacket provided longitudinally of said pipe and equipped with end openings for the discharge of steam into the lower portion of the column.

3. In combination with a gas-treating column providing a cylindrical chamber, a gas inlet pipe entering said chamber and adapted to deliver gas thereinto, means for contacting gas in said chamber with liquid, means for withdrawing gas from the upper portion of said chamber, and jacket means about said inlet pipe adjacent the discharge end thereof, said pipe being equipped with a plurality of apertures in the side wall thereof spaced from the discharge end thereof, said apertures communicating the interior of said pipe with the interior of said jacket means, and means for introducing steam into said jacket means.

4. The structure of claim 3, in which the said apertures are peripherally disposed about said inlet pipe and said jacket means is also equipped with openings in the end thereof adjacent the discharge end of said pipe, said openings communicating said jacket means with said chamber.

5. In combination with a gas-treating column providing a cylindrical chamber, a gas inlet pipe entering said chamber and adapted to discharge gas thereinto, means for contacting gas in said chamber with liquid, means for withdrawing gas from the upper portion of said chamber, and jacket means about said inlet pipe adjacent the discharge end of said pipe, means for introducing steam into said jacket means, said jacket means communicating with said inlet pipe at a spaced distance from the discharge end thereof through a plurality of apertures in said pipe, said jacket means also being equipped with apertures in the end thereof adjacent said discharge end.

References Cited in the file of this patent

UNITED STATES PATENTS

| | | |
|---|---|---|
| 701,898 | Larson | June 10, 1902 |
| 710,605 | Osborne et al. | Oct. 7, 1902 |
| 781,838 | Lowe | Feb. 7, 1905 |
| 824,800 | Matthews | July 3, 1906 |
| 1,112,860 | Smith | Oct. 6, 1914 |
| 1,632,572 | Willcox | June 14, 1927 |